US007836690B2

(12) United States Patent
Matsumoto et al.

(10) Patent No.: US 7,836,690 B2
(45) Date of Patent: Nov. 23, 2010

(54) POSITIONING CONTROL MECHANISM FOR DOUBLE-ACTING AIR CYLINDER

(75) Inventors: Takumi Matsumoto, Tsukubamirai (JP); Kazuhiro Noguchi, Tsukubamirai (JP)

(73) Assignee: SMC Corporation, Tokyo (JP)

( * ) Notice: Subject to any disclaimer, the term of this patent is extended or adjusted under 35 U.S.C. 154(b) by 439 days.

(21) Appl. No.: 12/047,934

(22) Filed: Mar. 13, 2008

(65) Prior Publication Data

US 2009/0007769 A1 Jan. 8, 2009

(30) Foreign Application Priority Data

Mar. 30, 2007 (JP) ............................ 2007-091486

(51) Int. Cl.
*F16D 31/02* (2006.01)
*F01B 1/00* (2006.01)
*F15B 13/04* (2006.01)

(52) U.S. Cl. ............................ 60/407; 91/165; 91/397; 91/454

(58) Field of Classification Search .................. 60/407, 60/409; 91/51, 52, 165, 166, 274, 321, 323, 91/397, 454
See application file for complete search history.

(56) References Cited

U.S. PATENT DOCUMENTS 4,281,584 A * 8/1981 Onken et al. .................. 91/323
4,510,849 A 4/1985 Khramtsov et al.
4,932,311 A * 6/1990 Mibu et al. .................... 91/165
7,021,191 B2 4/2006 Moler et al.

FOREIGN PATENT DOCUMENTS

| | | |
|---|---|---|
| EP | 1 068 932 A2 | 1/2001 |
| JP | 57-501587 | 9/1982 |
| JP | 58-35001 | 3/1983 |
| JP | 59-3001 | 1/1984 |
| JP | 5-321904 | 12/1993 |
| JP | 9-190222 | 7/1997 |

OTHER PUBLICATIONS

U.S. Appl. No. 12/047,646, filed Mar. 13, 2008, Matsumoto, et al.

* cited by examiner

*Primary Examiner*—Michael Leslie
(74) *Attorney, Agent, or Firm*—Oblon, Spivak, McClelland, Maier & Neustadt, L.L.P.

(57) ABSTRACT

Between an air source and a first pressure chamber of a double-acting main cylinder having a length measurement sensor for measuring an acting position of a piston, a supply solenoid valve is connected; between the first pressure chamber and the atmosphere, an exhaust solenoid valve is connected; and between a second pressure chamber and the air source, a stop solenoid valve is connected. When a target acting position of the piston is inputted into a controller, the controller moves the piston to the target acting position so that a position measured by the length measurement sensor agrees with the target position by on-off controlling the solenoid valves. Upon reaching the target position, the piston is stopped and held in the stopped state by confining air within the pressure chambers.

8 Claims, 5 Drawing Sheets

POSITIONING CONTROL MECHANISM FOR DOUBLE-ACTING AIR CYLINDER

TECHNICAL FIELD

The present invention relates to a positioning control mechanism capable of optionally controlling the operating position of an air cylinder used for conveying, chucking, or fabricating a workpiece. In other words, the present invention relates to a positioning control mechanism capable of optionally changing or adjusting the point of a force applied to the workpiece, and in particular it relates to a control mechanism for a double-acting air cylinder.

BACKGROUND ART

An actuator used for operations, such as conveying, chucking, and fabricating a workpiece, is operated by energy, such as pneumatic or hydraulic pressure and electricity. Among them, an electric actuator using the electric energy, although it is excellent in optionally changing or adjusting the point of a force applied to the workpiece, has a complicated structure, and it has especially complicated structure for obtaining linear motion. In order to obtain a large action force, the increase cannot be avoided in size and electric power, and for maintaining a predetermined stop position, the electric power supply must be continued meanwhile, so that the energy loss is also increased. Furthermore, when an action force is added to the load via a rod, etc., an impact is directly applied to a power transmitting portion of the actuator, so that not only the actuator suffers mechanical damage but also an excessive repulsive force may be applied to the load.

On the other hand, as a pneumatic actuator, an air cylinder has been well-known. The air cylinder, which converts energy of compressed air into linear motion, includes a double-acting air cylinder, in which by alternately supplying air into air chambers formed on both sides of a piston, the piston is reciprocally moved; and a single-acting air cylinder, in which by air supplied to or exhausted from an air chamber formed on one side of a piston and an urging force of a spring arranged on the other side, the piston is reciprocally moved. Any of these types is widely used for various operations because the linear motion can be obtained more readily than in the electric actuator.

However, generally, the operation stroke of the air cylinder is mechanically determined so as to reciprocally move between positions of advance and retreat ends defined by stoppers, so that it is difficult to change or adjust the operation stroke (operation positions). In particular, it is difficult to optionally change or adjust the operation stroke. Therefore, in general, air cylinders with different strokes are properly used depending on operation kinds.

DISCLOSURE OF INVENTION

It is an object of the present invention to enable a double-acting air cylinder to optionally change or adjust its piston operation positions depending on operation kinds with a simple positioning control mechanism using a sensor and solenoid valves.

In order to achieve the object described above, a positioning control mechanism according to the present invention includes a double-acting main cylinder having a first pressure chamber and a second pressure chamber on both sides of a piston in that the piston is reciprocated by air supplied to or exhausted from the pressure chambers; a length measurement sensor for measuring an acting position of the piston along the entire stroke of the piston; an air supply section having an air source; a main air circuit interposed between the air supply section and the main cylinder; and a controller for electrically controlling the main air circuit.

The main air circuit includes a first air flow path and a second air flow path connecting between the air supply section and the first and second pressure chambers of the main cylinder, respectively; to the first air flow path, a two-port supply solenoid valve is connected to intersect the first air flow path, while a two-port exhaust solenoid valve is connected at a position nearer to the first pressure chamber than the supply solenoid valve to intersect the flow path between the first pressure chamber and the atmosphere; and the second air flow path is configured to supply air at a set pressure to the second pressure chamber from the air supply section during the reciprocating of the piston while maintaining the state of the second pressure chamber restricted to the atmosphere.

Also, the controller includes inputting means electrically connected to the length measurement sensor and the solenoid valves for inputting a target acting position of the piston; and the controller is configured to move the piston to the target acting position and stop it at the position by on-off controlling the solenoid valves on the basis of the compared results between a target position information inputted by the inputting means and a measured position information measured by the length measurement sensor: when the piston is advanced, the supply solenoid valve is turned on so as to communicate the air supply section with the first pressure chamber while the exhaust solenoid valve is turned off so as to shut the first pressure chamber off the atmosphere, when the piston is backed, the supply solenoid valve is turned off so as to shut the air supply section off the first pressure chamber while the exhaust solenoid valve is turned on so as to open the first pressure chamber to the atmosphere, and when the piston is stopped at the target position and maintained at the stopped position, both the supply solenoid valve and the exhaust solenoid valve are turned off so as to confine air within the first pressure chamber.

According to the present invention, acting positions of the piston in a double-acting air cylinder can be optionally changed or adjusted depending on operation kinds with the simple positioning control mechanism composed of the length measurement sensor, a plurality of the two-port solenoid valves, and the controller without any mechanical adjustment.

According to the present invention, preferably, the main air circuit includes a two-port stop solenoid valve on-off controlled with the controller by being connected to the second air flow path, and during the advancing and retreating of the piston, the stop solenoid valve is turned on to make the second air flow path communicate, and during stopping and holding the piston at the stopped position, the stop solenoid valve is turned off to confine air within the second pressure chamber by shutting off the second air flow path.

According to the present invention, the positioning control mechanism may further include a double-acting slave cylinder with no length measurement sensor in addition to the main cylinder, and the slave cylinder may be positioning-controlled via the main air circuit following the main cylinder by being connected to the main air circuit in parallel with the main cylinder.

Alternatively, the positioning control mechanism may further include a double-acting slave cylinder with no length measurement sensor; and a slave air circuit connected to the slave cylinder to have the same configurations as those of the main air circuit, in addition to the main cylinder and the main air circuit, and the slave cylinder and the slave air circuit may also be positioning-controlled following the main cylinder and the main air circuit by being connected to the air supply section and the controller in parallel with the main cylinder and the main air circuit, respectively.

In this case, the stop solenoid valve in the main air circuit may be used for the stop solenoid valve in the slave air circuit in common.

According to the present invention, preferably, the air supply section includes regulators for maintaining the air pressure at a set pressure.

BEST MODE FOR CARRYING OUT THE INVENTION

Figure 1:
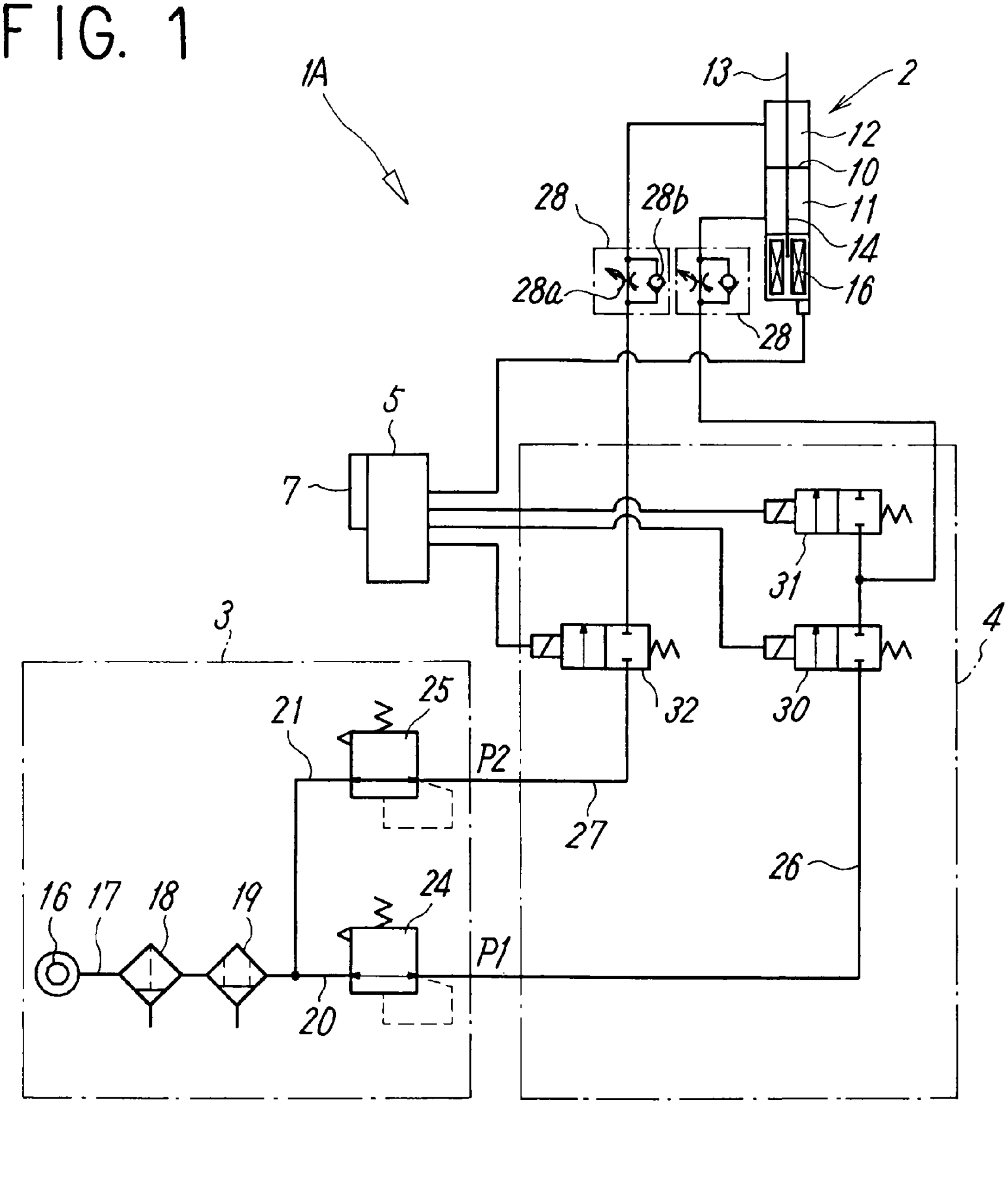
FIG. 1 is a connection diagram of a positioning control mechanism according to a first embodiment of the present invention.

FIG. 1 shows a connection diagram with symbols of a positioning control mechanism for a double-acting air cylinder according to a first embodiment of the present invention. In a positioning control mechanism 1A according to the first embodiment, reference numeral 2 denotes a main cylinder composed of a double-acting air cylinder; numeral 3 an air supply section for supplying pressurized air to the main cylinder 2; numeral 4 a main air circuit interposed between the air supply section 3 and the main cylinder 2; and numeral 5 a controller for electrically controlling the main air circuit 4.

The main cylinder 2 includes a first pressure chamber 11 and a second pressure chamber 12 that are formed on both sides of a piston 10, so that by the air supplied to or exhausted from the pressure chambers 11 and 12, the piston 10 is linearly reciprocated within the main cylinder 2. At one end of the piston 10, an operation rod 13 is connected to pass through the second pressure chamber 12 and extend outside from the end of the main cylinder 2. By the abutment of the operation rod 13, an action force is applied to a workpiece for conveying, chucking, or fabricating the workpiece.

At the other end of the piston 10 opposite to the operation rod 13, a length measurement rod 14 with a diameter and a cross-sectional area smaller than those of the operation rod 13 is connected to pass through the first pressure chamber 11 and extend outside from the end of the main cylinder 2, so that the length measurement rod 14 reaches the position of a length measurement sensor 6 added to the main cylinder 2. Then, by detecting the displacement of the length measurement rod 14 with the length measurement sensor 6, the active position of the piston 10 (that is, the operation rod 13) is to be measured along the whole range of the stroke. The position measurement signal is fed back to the controller 5 from the length measurement sensor 6.

The measurement of the active position is to be performed by magnetically, electrically, or optically reading the scale marked on the length measurement rod 14 with the length measurement sensor 6; however, the measurement system with the length measurement sensor 6 is not limited to the method using such a length measurement rod 14, so that other measurement methods may be used.

The air supply section 3 includes an air source 16 for outputting pressurized air; a filter 18 with a drain discharge portion and an oil mist separator 19, which are connected in series along a supply flow path 17 communicated with the air source 16; and first and second regulators 24 and 25 connected to first and second branch flow paths 20 and 21, respectively, which are communicated with the supply flow path 17. The first branch flow path 20 is for supplying air to the first pressure chamber 11 of the main cylinder 2 via a first air flow path 26 of the main air circuit 4 while the second branch flow path 21 is for supplying air to the second pressure chamber 12 of the main cylinder 2 via a second air flow path 27 of the main air circuit 4.

The regulators 24 and 25 are composed of pressure reducing valves with relieving mechanisms for maintaining air pressure at a set pressure. The air pressure P1 outputted from the first regulator 24 and the air pressure P2 outputted from the second regulator 25 are established to satisfy the relationship $P1 \geqq P2$.

The main air circuit 4 includes the first air flow path 26 connecting between the air supply section 3 and the first pressure chamber 11 of the main cylinder 2 and the second air flow path 27 connecting between the air supply section 3 and the second pressure chamber 12 of the main cylinder 2. Among them, in the first air flow path 26, a two-port supply solenoid valve 30 is connected to intersect the first air flow path 26 and a two-port exhaust solenoid valve 31 is connected at a position nearer to the first pressure chamber 11 than the supply solenoid valve 30 to intersect the flow path between the first pressure chamber 11 and the atmosphere. In the second air flow path 27, a two-port stop solenoid valve 32 is connected to intersect the second air flow path 27. In the first and second air flow paths 26 and 27, speed controllers 28 are connected, respectively, each speed controller 28 having a variable restrictor 28*a* and a check valve 28*b*, which are connected in parallel with each other. The speed controller 28 is for adjusting the operating speed of the piston 10 by limiting the flow rate of the air flowing into or from the pressure chamber 11 or 12 with the variable restrictor 28*a*; however, the speed controller 28 is not always necessary.

The controller 5 is being electrically connected to the length measurement sensor 6 and the solenoid valves 30, 31, and 32, and it includes inputting means 7 for inputting a target acting position of the piston 10. The inputting means 7 is for inputting the advance end position and/or the retreat end position of the piston 10, or the operating stroke of the piston 10 relative to the advance end or the retreat end as a reference, by the key, button, or volume operation. When the target position is inputted by the inputting means 7, the controller 5 compares the target position information with the position information measured by the length measurement sensor 6 so as to move the piston 10 to the target position and to stop it at the position for maintaining the stop state by on-off controlling the solenoid valves 30, 31, and 32 on the basis of the compared results.

The control example by the controller 5 will be specifically described. When the advance end position and the retreat end position of the piston 10 are inputted by the inputting means 7 as target positions, the piston 10 is reciprocated between the advance end and the retreat end by the controller 5. In the advance process of the piston 10 from the retreat end to the advance end, both the supply solenoid valve 30 and the stop solenoid valve 32 are turned on so that the first pressure chamber 11 and the second pressure chamber 12 are communicated with the air supply section 3, while the exhaust solenoid valve 31 is turned off so that the first pressure chamber 11 is shut off the atmosphere. Then, to the first pressure chamber 11 and the second pressure chamber 12, the air at the pressure P1 and the air at the pressure P2 are supplied, respectively. Since the air pressure acting force (P1×S1) acting on the piston plane adjacent to the first pressure chamber 11 (area S1) is larger than that (P2×S2) acting on the piston plane adjacent to the second pressure chamber 12 (area S2), the piston 10 and the rod 13 advance.

The acting position of the piston 10 is always measured by the length measurement sensor 6 via the length measurement rod 14 so as to be fed back to the controller 5 as the measured position information. Then, the controller 5 compares the measured position information with the target position information, and the above-mentioned control of the solenoid valves is continued until the deviation becomes zero.

When the piston 10 reaches the advance end and the deviation between the measured position information and the target position information becomes zero, both the supply solenoid valve 30 and the stop solenoid valve 32 are turned off by the controller 5, so that the first air flow path 26 and the second air flow path 27 are blocked off, and air is confined within the first pressure chamber 11 and the second pressure chamber 12. Thereby, the piston 10 is stopped at the advance end position and held in the stopped state.

Next, in the retreat process of the piston 10 from the advance end to the retreat end, by the controller 5, the supply solenoid valve 30 is turned off so that the first pressure chamber 11 is blocked off the air supply section 3; the exhaust solenoid valve 31 is turned on, so that the first pressure chamber 11 is opened to the atmosphere; and the stop solenoid valve 32 is turned on, so that the air supply section 3 is communicated with the second pressure chamber 12. Thereby, the air pressure of the second pressure chamber 12 becomes higher than that of the first pressure chamber 11, so that the piston 10 and the rod 13 move toward the retreat end.

The acting position of the piston 10 is always measured by the length measurement sensor 6 and the length measurement rod 14 so as to be fed back to the controller 5 as the measured position information. Then, the controller 5 compares the measured position information with the target position information, and the above-mentioned control of the solenoid valves is continued until the deviation becomes zero.

When the piston 10 reaches the retreat end and the deviation between the measured position information and the target position information becomes zero, both the exhaust solenoid valve 31 and the stop solenoid valve 32 are turned off by the controller 5, so that air is confined within the first pressure chamber 11 and the second pressure chamber 12. Thereby, the piston 10 is stopped at the retreat end and held in the stopped state.

In such a manner, according to the positioning control system described above, the acting positions of the piston 10 in a double-acting air cylinder can be optionally changed or adjusted depending on operation kinds with the simple positioning control mechanism composed of the length measurement sensor 6, a plurality of the two-port solenoid valves 30, 31, and 32, and the controller 5 without any mechanical adjustment.

Figure 2:
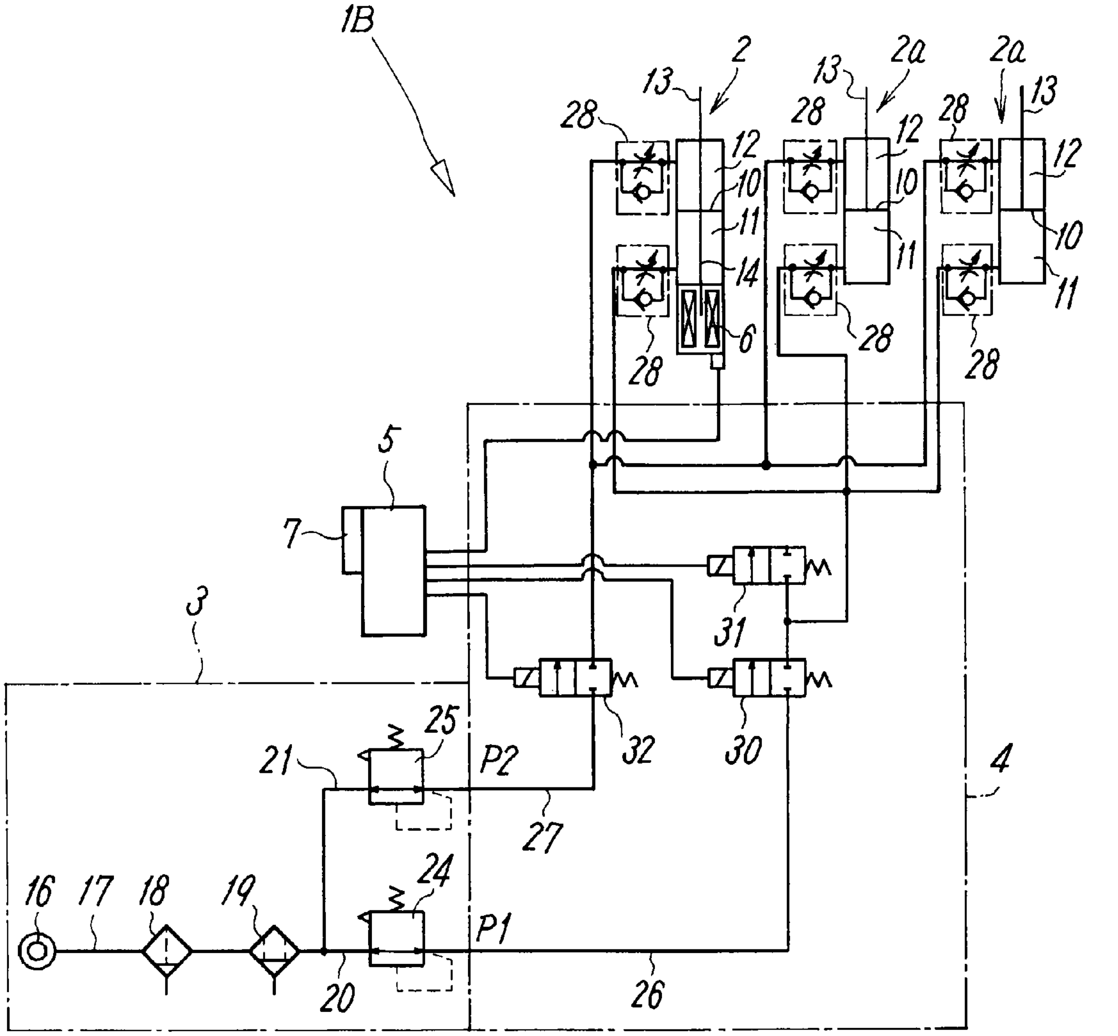
FIG. 2 is a connection diagram of a positioning control mechanism according to a second embodiment of the present invention.

FIG. 2 shows a positioning control mechanism according to a second embodiment of the present invention. A positioning control mechanism 1B according to the second embodiment includes at least one double-acting slave cylinder 2*a* without the length measurement sensor 6 in addition to the main cylinder 2, the main air circuit 4, the air supply section 3, and the controller 5, which have the same configurations as those in the positioning control mechanism 1A according to the first embodiment. The slave cylinder 2*a* is connected to the main air circuit 4 in parallel with the main cylinder 2. Upon controlling the main air circuit 4 with the controller 5, the slave cylinder 2*a* can be synchronously position-controlled by the main air circuit 4, following the main cylinder 2.

Since the slave cylinder 2*a* has the same configuration and effect as those in the main cylinder 2 except for the point having no length measurement sensor, like reference characters designate like components common to the main cylinder 2, and the description of configuration and effect is omitted.

To the first air flow path 26 communicated with the first pressure chamber 11 of the slave cylinder 2*a* and to the second air flow path 27 communicated with the second pressure chamber 12, the speed controllers 28, which are the same as in the main cylinder 2, may be connected, respectively, if necessary.

Figure 3:
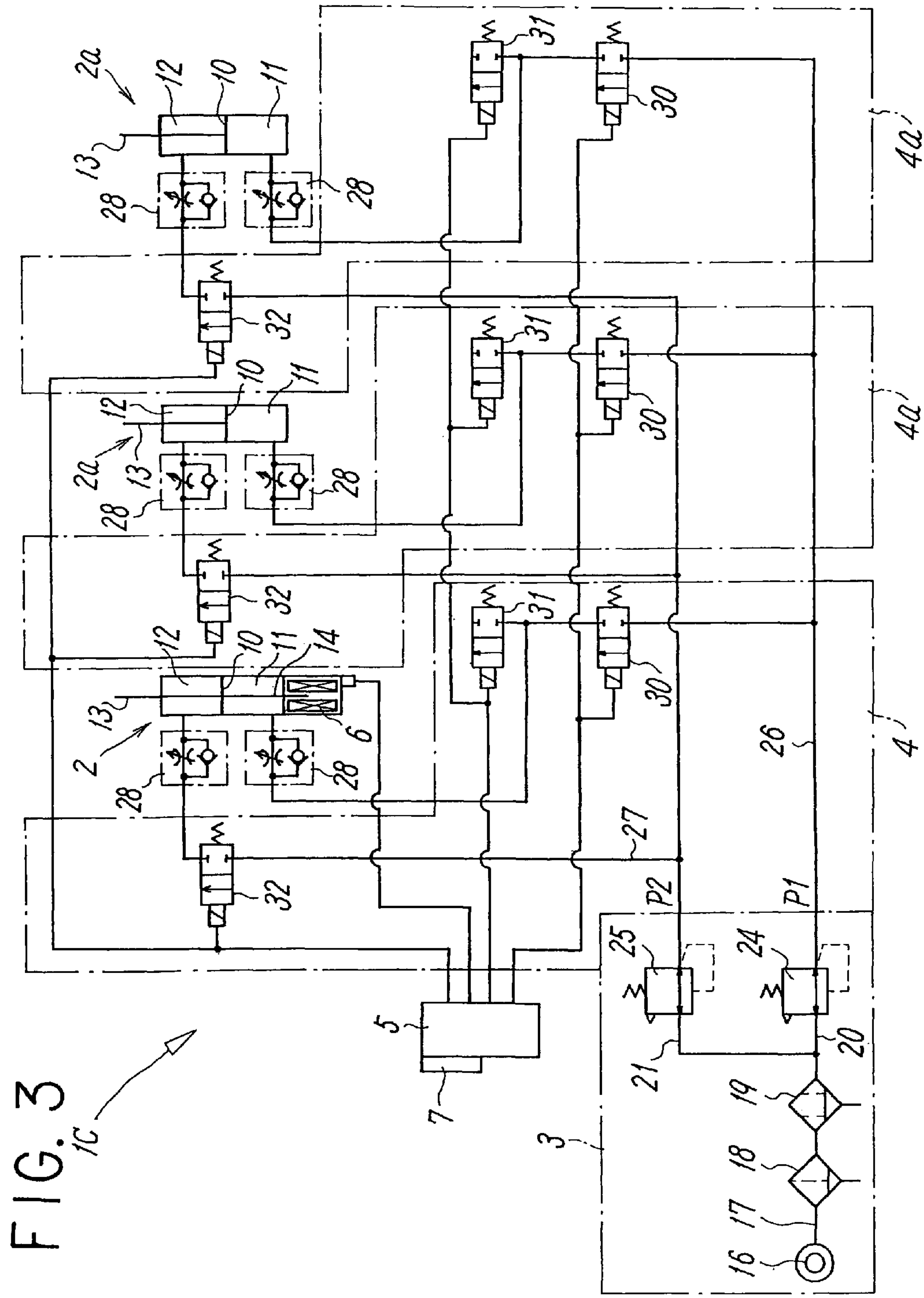
FIG. 3 is a connection diagram of a positioning control mechanism according to a third embodiment of the present invention.

FIG. 3 shows a positioning control mechanism according to a third embodiment of the present invention. The point of a positioning control mechanism 1C according to the third embodiment different from the positioning control mechanism 1B according to the second embodiment is that between each slave cylinder 2*a* and the air supply section 3, a slave air circuit 4*a* having the same configuration as that of the main air circuit 4 is connected in parallel with the main air circuit 4; and the supply solenoid valve 30, the exhaust solenoid valve 31, and the stop solenoid valve 32 of each slave air circuit 4*a* are electrically connected to the controller 5 in parallel with the supply solenoid valve 30, the exhaust solenoid valve 31, and the stop solenoid valve 32 of the main air circuit 4, respectively. Hence, according to the third embodiment, upon controlling the main air circuit 4 with the controller 5, the slave air circuit 4*a* operates synchronously following the main air circuit 4, so that the slave cylinder 2*a* is synchronously position-controlled following the main cylinder 2.

Since the configuration and effect of the third embodiment other than the above-mentioned point are substantially the same as those of the second embodiment, like reference characters designate like components common to the second embodiment, and the description of configurations and effect is omitted.

Figure 4:
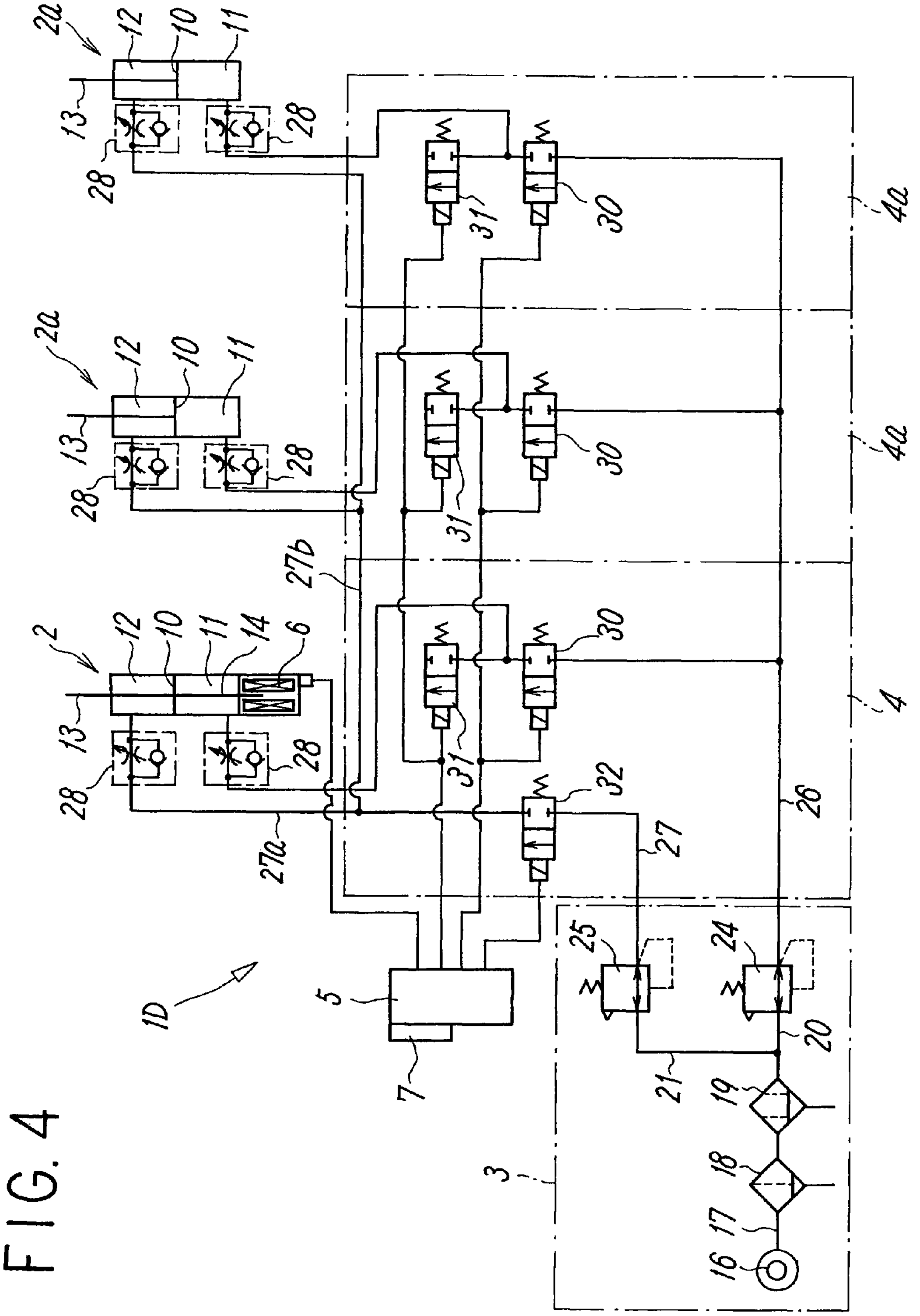
FIG. 4 is a connection diagram of a positioning control mechanism according to a fourth embodiment of the present invention.

FIG. 4 shows a positioning control mechanism according to a fourth embodiment of the present invention. The point of a positioning control mechanism 1D according to the fourth embodiment different from the positioning control mechanism 1C according to the third embodiment is that the stop solenoid valve 32, which is provided in the slave air circuit 4*a* according to the third embodiment, is omitted according to the fourth embodiment and the stop solenoid valve 32 of the main air circuit 4 is used for this in common. That is, to a flow path part 27*a* connecting between the stop solenoid valve 32 provided along the second air flow path 27 of the main air circuit 4 and the second pressure chamber 12 of the main cylinder 2, the second pressure chambers 12 of the slave cylinders 2*a* are connected via a branch flow path 27*b* in parallel with each other.

Since the configuration and effect of the fourth embodiment other than the above-mentioned point are substantially the same as those of the third embodiment, like reference characters designate like components common to the second embodiment, and the description of configurations and effect is omitted.

Figure 5:
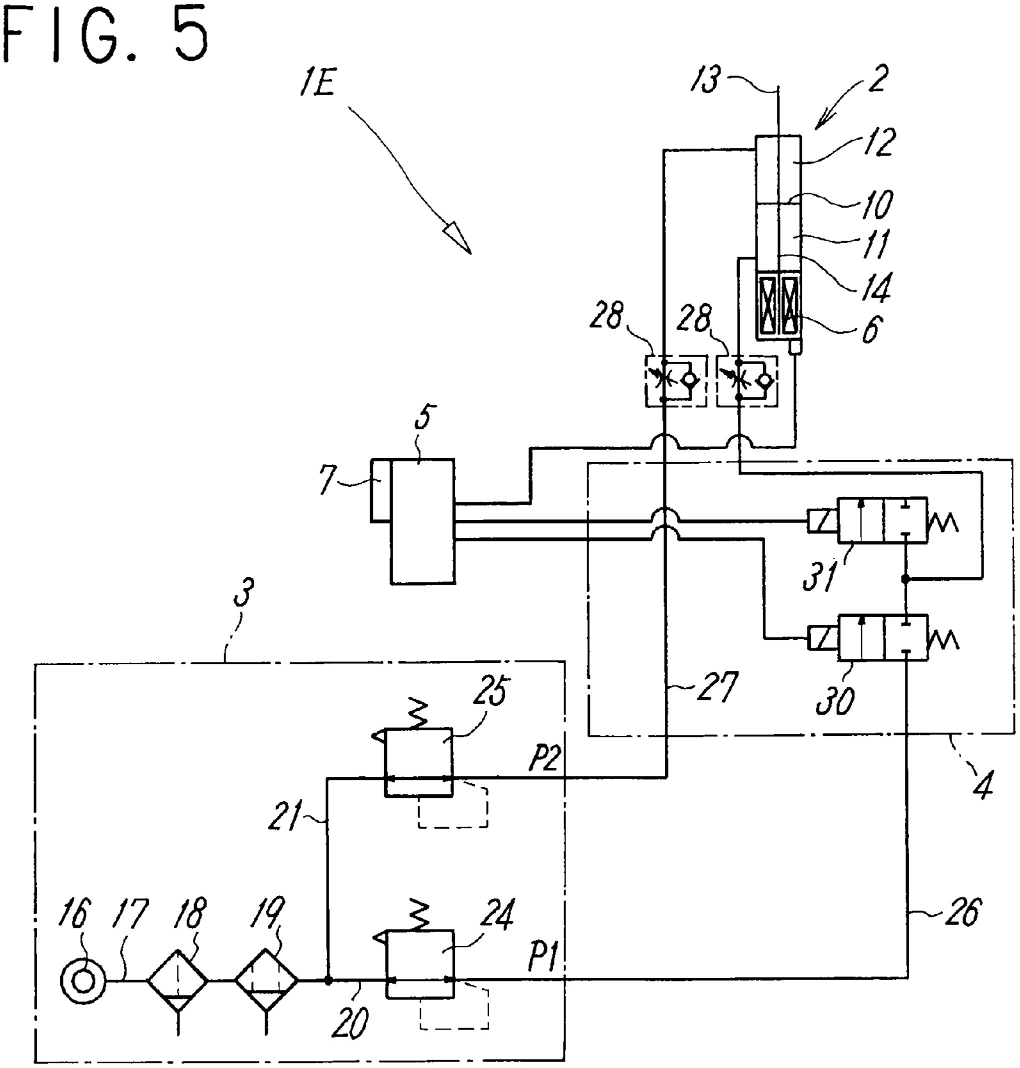
FIG. 5 is a connection diagram of a positioning control mechanism according to a fifth embodiment of the present invention.

FIG. 5 shows a positioning control mechanism according to a fifth embodiment of the present invention. The point of a positioning control mechanism 1E according to the fifth embodiment different from the positioning control mechanism 1A according to the first embodiment is that the stop solenoid valve 32, which is provided in the second air flow path 27 of the main air circuit 4 according to the first embodiment, is omitted. Hence, the second pressure chamber 12 of the main cylinder 2 is always communicated with the second branch flow path 21 of the air supply section 3 via the second air flow path 27, so that the air at the set pressure P2 outputted from the second regulator 25 is always supplied to the second pressure chamber 12.

Since the configuration and effect of the fifth embodiment other than the above-mentioned point are substantially the same as those of the first embodiment, like reference characters designate like components common to the first embodiment, and the description of configurations and effect is omitted.

Like the fifth embodiment, even when the stop solenoid valve is omitted, although holding accuracies at the stop position are slightly inferior to a case where the stop solenoid valve is provided, the positioning can be sufficiently controlled so as to achieve the object of the present invention.

Even in the positioning control mechanisms according to the first to fourth embodiments, the stop solenoid valve 32 may be omitted.

Figure 6:
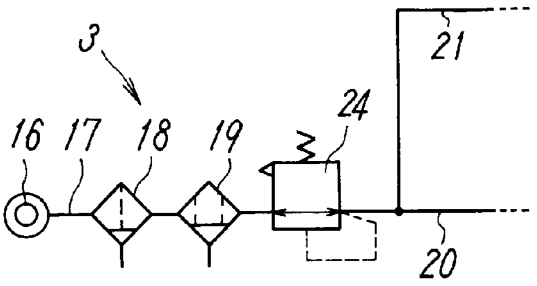
FIG. 6 is a connection diagram of another different example of an air supply section.

According to the embodiments described above, the air supply section 3 has the regulators 24 and 25 in the first branch flow path 20 and the second branch flow path 21, respectively; alternatively, as shown in FIG. 6, one regulator 24 may also be only provided in the supply flow path 17. In this case, the first branch flow path 20 and the second branch flow path 21 are branched from the output point of the regulator 24, so that the air at the same pressure is to be supplied.

Furthermore, in the embodiments described above, the solenoid valves 30, 31, and 32 in the main air circuit 4 or the slave air circuit 4*a* may be provided independently or may be grouped as a solenoid valve assembly. Alternatively, they may also be mounted on the corresponding the main cylinder 2 or the slave cylinder 2*a*. Furthermore, the controller 5 may be assembled in the main cylinder 2. Also, when the speed controllers 28 are provided, they may also be assembled in the corresponding the main cylinder 2 or the slave cylinder 2*a*.

The invention claimed is:

1. A positioning control mechanism for a double-acting air cylinder comprising:

a double-acting main cylinder having a first pressure chamber and a second pressure chamber on both sides of a piston in that the piston is reciprocated by air supplied to or exhausted from the pressure chambers;

a length measurement sensor for measuring an acting position of the piston along the entire stroke of the piston;

an air supply section having an air source;

a main air circuit interposed between the air supply section and the main cylinder; and a controller for electrically controlling the main air circuit, wherein the main air circuit includes a first air flow path and a second air flow path connecting between the air supply section and the first and second pressure chambers of the main cylinder, respectively; to the first air flow path, a two-port supply solenoid valve is connected to intersect the first air flow path, while a two-port exhaust solenoid valve is connected at a position nearer to the first pressure chamber than the supply solenoid valve to intersect the first air flow path between the first pressure chamber and the atmosphere; and the second air flow path is configured to supply air at a set pressure to the second pressure chamber from the air supply section during the reciprocating of the piston while maintaining the state of the second pressure chamber restricted to the atmosphere, and wherein the controller includes inputting means electrically connected to the length measurement sensor and the solenoid valves for inputting a target acting position of the piston; and the controller is configured to move the piston to the target acting position and stop it at the position by on-off controlling the solenoid valves on the basis of the compared results between target position information inputted by the inputting means and measured position information measured by the length measurement sensor: when the piston is advanced, the supply solenoid valve is turned on so as to communicate the air supply section with the first pressure chamber while the exhaust solenoid valve is turned off so as to shut the first pressure chamber off the atmosphere, when the piston is backed, the supply solenoid valve is turned off so as to shut the air supply section off the first pressure chamber while the exhaust solenoid valve is turned on so as to open the first pressure chamber to the atmosphere, and when the piston is stopped at the target position and maintained at the stopped position, both the supply solenoid valve and the exhaust solenoid valve are turned off so as to confine air within the first pressure chamber.

2. The mechanism according to claim 1, wherein the main air circuit includes a two-port stop solenoid valve on-off controlled with the controller by being connected to the second air flow path, and wherein during the advancing and retreating of the piston, the stop solenoid valve is turned on to make the second air flow path communicate, and during stopping and holding the piston at the stopped position, the stop solenoid valve is turned off to confine air within the second pressure chamber by shutting off the second air flow path.

3. The mechanism according to claim 1, further comprising a double-acting slave cylinder with no length measurement sensor in addition to the main cylinder, wherein the slave cylinder is positioning-controlled via the main air circuit following the main cylinder by being connected to the main air circuit in parallel with the main cylinder.

4. The mechanism according to claim 2, further comprising a double-acting slave cylinder with no length measurement sensor in addition to the main cylinder, wherein the slave cylinder is positioning-controlled via the main air circuit following the main cylinder by being connected to the main air circuit in parallel with the main cylinder.

5. The mechanism according to claim 1, further comprising:

a double-acting slave cylinder with no length measurement sensor; and a slave air circuit connected to the slave cylinder to have the same configurations as those of the main air circuit, in addition to the main cylinder and the main air circuit, wherein the slave cylinder and the slave air circuit are positioning-controlled following the main cylinder and the main air circuit by being connected to the air supply section and the controller in parallel with the main cylinder and the main air circuit, respectively.

6. The mechanism according to claim 2, further comprising:

a double-acting slave cylinder with no length measurement sensor; and a slave air circuit connected to the slave cylinder to have the same configurations as those of the main air circuit, in addition to the main cylinder and the main air circuit, wherein the slave cylinder and the slave air circuit are positioning-controlled following the main cylinder and the main air circuit by being connected to the air supply section and the controller in parallel with the main cylinder and the main air circuit, respectively.

7. The mechanism according to claim 6, wherein the stop solenoid valve in the main air circuit is used for the stop solenoid valve in the slave air circuit in common.

8. The mechanism according to any one of claims 1 to 7, wherein the air supply section includes regulators for maintaining the air pressure at a set pressure.

* * * * *